United States Patent [19]

Wheeler et al.

[11] Patent Number: 5,415,113
[45] Date of Patent: May 16, 1995

[54] PORTABLE INCINERATION APPARATUS

[75] Inventors: Charles E. Wheeler, Stuart; Wayne C. Ritch, Port Salerno, both of Fla.

[73] Assignee: Air Burners, Inc., Palm City, Fla.

[21] Appl. No.: 220,711

[22] Filed: Mar. 31, 1994

[51] Int. Cl.⁶ .............................................. F23D 3/00
[52] U.S. Cl. ..................................... 110/241; 110/310
[58] Field of Search ............... 110/240, 241, 235, 248, 110/297, 310, 314; 454/188, 189, 190, 192

[56] References Cited

U.S. PATENT DOCUMENTS

| | | | |
|---|---|---|---|
| 3,785,302 | 1/1974 | Davis | 110/240 X |
| 3,785,303 | 1/1974 | Hopkins | 110/240 X |
| 4,771,709 | 9/1988 | Applegate | 110/235 |
| 5,050,509 | 9/1991 | Mormino | 110/235 |

Primary Examiner—Denise L. Gromada
Attorney, Agent, or Firm—McHale & Slavin

[57] ABSTRACT

The present invention is a portable incineration apparatus. The portable incinerator includes a box having four walls with a top and bottom opening. The inside of the walls are lined with a layer of refractory material to form a combustion chamber in combination with the bottom opening which is placed on the ground. A source of high velocity air is in communication with a manifold assembly which is adapted to direct an effective sheet or curtain of high velocity air across the top opening and down into the combustion chamber to maintain a substantially uniform discharge rate of the high velocity air as it exits the manifold assembly along the top opening. The uniform curtain of air over the top opening limits the amount of smoke, ash and other particulate released into the atmosphere during the burning process. The rotational turbulence provides an oxygen enriched environment within the chamber, accelerating the combustion of the vegetation waste and resulting in a more complete burn by raising the temperatures within the combustion chamber.

11 Claims, 4 Drawing Sheets

PORTABLE INCINERATION APPARATUS

FIELD OF THE INVENTION

The present invention is directed to the disposal of waste vegetation and more particularly to a self-contained transportable apparatus for incinerating capable of reducing vegetation to a high quality soil additive.

BACKGROUND OF THE INVENTION

The disposal of waste vegetation, such as trees, brush, yard waste, etc. is a major concern of the municipal, commercial, and private sectors. Various types of recycling equipment and techniques are in use or have been proposed to dispose of such waste, all with varying degrees of success.

One method of disposal is to transport and bury the waste in a landfill. However, landfill sites are becoming scarce and those remaining are cost prohibitive especially in rapidly growing urban areas. In addition, even if suitable sites can be found, they are often at a distance that makes transportation cost prohibitive. Since vegetation waste makes up approximately 40% of the bulk typically buried in landfills, most large cities require that the waste be separated from conventional garbage for purposes of mulch and compost manufacture in an effort to recycle the waste.

Each year there are tens of thousands of acres of land cleared of trees, brush, etc. for development and millions of tons of yard waste (small branches, leaves, grass, etc.) produced. Reducing the amount of such waste being buried or mulched would significantly reduce the pressure on existing landfills and delay the need for opening new landfill sites. In addition, landfills are a relatively inefficient method of recycling. Being simply buried at one site, the economic potential of the waste material is never fulfilled. Therefore, there is a need for an alternative disposal process capable of diverting such waste material from already over-crowded landfills to allow the commercial sector to process and sell products produced from the waste material.

One option to landfills has been to incinerate the waste material. This produces an ash residue which is extremely high in natural nutrients beneficial for plant growth. When the ash is mixed with compost and varying amounts of soil, a range of products from high-grade potting soil to top soil are developed. Open burning of the vegetation waste on site is the simplest and most cost effective way of incinerating the waste material. However, due to the many environmental limitations imposed by Federal, State, and local jurisdictions, open burning is not always feasible or possible. Many such regulations significantly limit the amount of ash and smoke that may be released into the atmosphere.

Air curtain incinerators such as that disclosed in U.S. Pat. No. 4,756,258 were developed to permit the incineration of such vegetation waste while minimizing the amount of ash and smoke being released. With such an incinerator, the vegetation waste is loaded into a fire pit through an opening and ignited. High velocity air from a manifold positioned along the opening is then blown over and into the pit. The manifold disclosed in the '258 patent distributed the high velocity air such that a greater amount of air exited the manifold at its center and outer-most ends compared to its intermediate sections (i.e., between the center and the two ends). This non-uniform air flow pattern was intended to cause a down-draft to form pulling outside air into the pit rather than releasing smoke and ash into the atmosphere. However, this blower system has proved to be inadequate in preventing the controlled release of smoke and ash. In addition, because the vegetation waste must be transported to the fire pit, this particular incineration technique has the added drawback of the associated transportation costs.

Another drawback of open pit incineration is the need for creation of the pit. This requires the employment of an earth mover and an operator familiar with pit construction. In many instances neither an earth mover or a qualified operator is available and timber is incinerated in an open stance. This poses additional problems in that wind gusts could cause the loss of fire control.

SUMMARY OF THE INVENTION

An objective of the present invention is to provide an apparatus capable of diverting vegetation waste from landfills at lower disposal costs.

Another objective of the present invention is to provide a process which allows products to be produced from the vegetation waste.

Still another objective of the present invention is to provide a portable incineration apparatus capable of being transported to the source of vegetation waste, such as land being cleared for future development, for on-sire processing.

Yet still another objective of the present invention is to provide a portable incineration apparatus capable of achieving high levels of combustion with minimal escaped unburned particulate.

Still another objective of the present invention is to provide such a portable incineration apparatus capable of limiting the amount of particulate and smoke released into the atmosphere during the burning process to within all Federal and most, if not all, state and local environmental regulations.

The above and other objectives of the present invention are obtained by providing a portable incineration apparatus which includes a box having four walls with a top opening and a bottom opening. The inside of the walls are lined with a layer of refractory material to form a combustion chamber. Preferably the size of the combustion chamber is optimized to permit the largest volume of vegetation waste to be burned at one time while still enabling the incinerator to be transportable.

The present incinerator also includes a source of high velocity air that is in air transfer communication with a manifold assembly. The incinerator preferably includes its own supply of power for producing the high velocity air. The manifold assembly is adapted to direct an effective sheet or curtain of high velocity air across the top opening and down into the combustion chamber and to maintain a substantially uniform discharge rate of the high velocity air as it exits the manifold assembly along the top opening. The high velocity air curtain covers the top opening and creates a rotational turbulence within the combustion chamber. It has been found that because of the substantially uniform discharge rate, the resulting curtain of high velocity air over the top opening limits the amount of particulate, such as ash, released into the atmosphere during combustion and virtually eliminates opacity or smoke. The resulting high velocity air curtain is also more likely to trap unburned particulate as well. This trapped material is then subsequently burned, thereby enabling combustion of up to 100% of the vegetation waste. The rotational turbulence provides an oxygen enriched environment within the chamber and thereby accelerates the combustion of the vegetation waste and results in a more complete burn (i.e., combustion) by raising the temperatures within the chamber.

With such a high degree of combustion, the bulk of the vegetation waste is reduced by up to 98% with only a small amount of residual ash remaining. Even so, after days of burning, the ash can build up on the bottom of the combustion chamber and reduce its efficiency. To facilitate the removal of this built-up ash, one of the walls of the combustion box preferably includes at least one door that opens outwardly. With the door open, the chamber may then be dragged forward and the ash left behind on the ground. The ash can then be sold to a nursery or mixed-in with the local soil as a desirable, non-polluting nutrient additive.

To facilitate moving the present incinerator during this process, skids may be mounted to the bottom of the combustion box. A tractor can be used to drag the chamber during this process, or preferably, the present incinerator may include a winch and cable assembly instead. The cable could be attached to any sufficiently fixed object, such as a large tree and the incinerator pulled toward the tree by the winch.

In order to optimize the combustion of the vegetation waste, the temperatures inside the combustion chamber should approach 2500° F. to 2800° F. To reach the optimum combustion temperatures as quickly as possible, the present incinerator preferably includes a system for initially igniting and fueling the combustion of the vegetation waste until these temperatures are achieved.

The above and other objectives, features, and advantages of the present invention will become apparent upon consideration of the detailed description and the penned drawings.

DETAILED DESCRIPTION OF THE INVENTION

Figure 1:
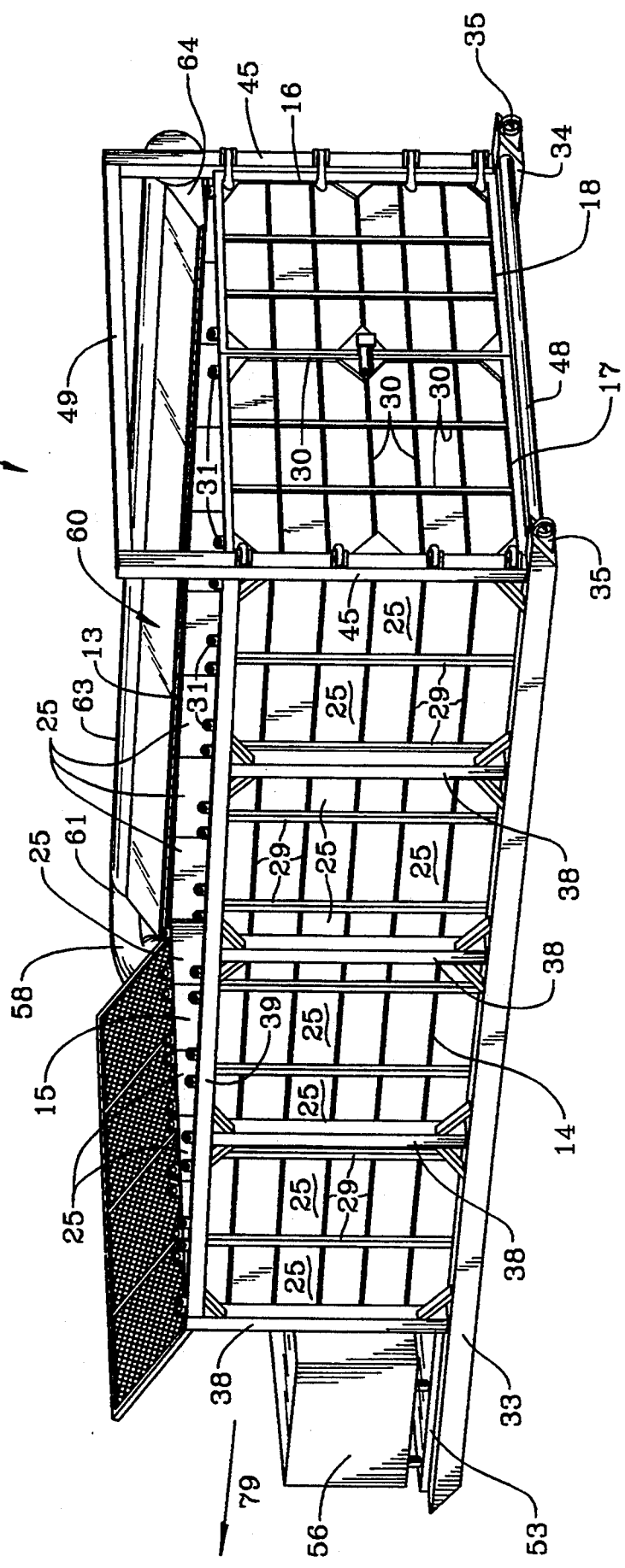
FIG. 1 is a perspective view of one embodiment of the present portable incineration apparatus with its doors closed.
Figure 2:
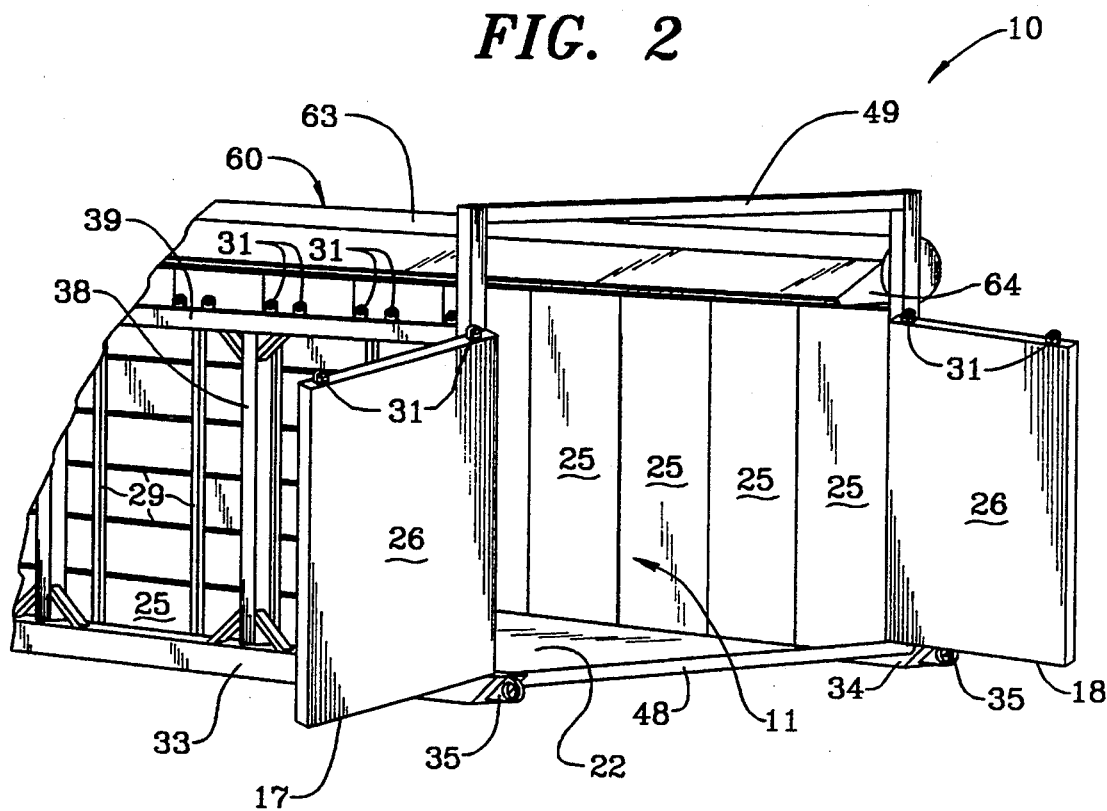
FIG. 2 is a partial perspective view of the portable incinerator of FIG. 1 showing its refractory paneled doors in an opened condition.

Although the present invention is herein described in terms of a specific embodiment, it will be readily apparent to those skilled in this art that various modifications, rearrangements, and substitutions can be made without departing from the spirit of the invention. The scope of the present invention is thus only limited by the claims appended hereto.

Referring generally to FIGS. 1-5, a portable incineration apparatus 10 includes a combustion chamber 11 in the form of a box having two side walls 13 and 14, a front end wall 15 and a back end wall 16. End wall 16 is formed by double doors 17 and 18 which are each hinged along one side to open outwardly. The combustion box also has a top opening 21 and a bottom opening 22. Therefore, the ground effectively forms the bottom of combustion chamber 11. Each wall 13-15 is lined on the inside with a layer of refractory material in the form of refractory panels 25. The inside of each door 17 and 18 is similarly lined with a refractory panel 26. Each panel 25 and 26 is constructed with $\frac{3}{8}'' \times 4'' \times 4''$ steel angle having $\frac{3}{8}'' \times 2''$ flat bar back supports and $\frac{1}{4}''$ thick 304 stainless steel holding clips all continuously welded into a suitably sized sub-frame 29 and 30, respectively. Each sub-frame 29, 30 is poured solid 4" thick with a 2800° F. rated refractory material that is castable and strengthened with stainless steel needles. Satisfactory results have been obtained using a refractory material named Kaocrete 28-LI "RFT" filled with stainless steel needles.

After the refractory is cured, the panels 25, 26 each have a cold crushing strength of up to 5000 PSI. Each panel 25 and sub-frame 29 weighs approximately 1200 lbs. and is equipped with two $\frac{1}{2}''$ plate steel pad eyes 31 for easy removal and replacement. Each refractory panel door 17 and 18 (i.e., panel 26 and sub-frame 30) weighs approximately 1700 lbs. and is supported by four hinges fabricated from $\frac{1}{2}''$ plate steel and 1" cold rolled bar stock. The doors 17 and 18 are latched together with a $\frac{3}{8}''$ angle swing bar and a slot receiver for ease of operation. Two $\frac{1}{2}''$ plate steel pad eyes 31 are mounted on top of each door 17, 18 for easy removal and replacement.

Each panel/sub-frame 25/29 forming walls 13-15 and each panel/sub-frame 26/30 forming doors 17 and 18 is supported by a frame 32 of suitable strength. Frame 32 includes two skids 33 and 34, each made of a length of 10" square steel tubing having a wall thickness of $\frac{1}{2}''$ for durability and longevity. Either end of skids 33 and 34 are beveled at 45° with a $\frac{1}{2}''$ plate welded over each end to make it easier to drag the incinerator 10 over the ground. A 1" steel plate pad eye 35 is welded on each end of both skids 33 and 34. Cables (not shown) may then be attached to the pad eyes 35 at either end of skids 33 and 34 for moving incinerator 10. Vertical and horizontal support members 38 and 39 for the refractory panels 25 are fabricated with W6×25# wide flange I-beams. Each of the panels 25 is held in place at its top to the web of its corresponding horizontal I-beam 39 by at least two $\frac{3}{8}''$ steel clips 42 (See FIG. 4). A length of $2\frac{1}{2}'' \times \frac{3}{8}''$ angle bar 40 is welded along the top of each skid 33 and 34 for receiving at least two such clips 42 fixed near the bottom of each panel 25. Clips 42 are not designed to bare the full weight of panels 25. Rather panels 25 are intended to rest on the ground. A $\frac{1}{4}''$ gap is left between the panels 25 to accommodate expansion and contraction from the generated heat. Lengths of $\frac{1}{4}'' \times 2''$ flat bar is welded to the back of each panel 25 to cover this $\frac{1}{4}''$ gap. Each door 17 and 18 is hung from another vertical support member 45, made from a W8×31# wide flange I-beam, using four hinge mounts, made out of $\frac{1}{2}''$ steel plate, welded into the web of its vertical beam 45. All vertical support members 38 and 45 are secured in place with 3"×4.1# channel gussets at both the top and bottom. A 6" schedule 80 black pipe cross brace 48 is welded between the back ends of skids 33 and 34 below doors 17 and 18. A similar brace member 49 is welded between beams 45 above doors 17 and 18. Braces 48 and 49 maintain the spacing between doors 17 and 18. In addition, brace 48 may be used to lift or bare the weight of that end of incinerator 10 without stressing doors 17 and 18. The size of the combustion chamber 11 is optimized to permit the largest volume of vegetation waste to be burned at one time while still enabling the incinerator 10 to be transportable. For example, chambers as large as 27' 2½" long, 8' 4½" wide and 8' 1" deep have been produced which are still transportable in one piece.

Figure 3:
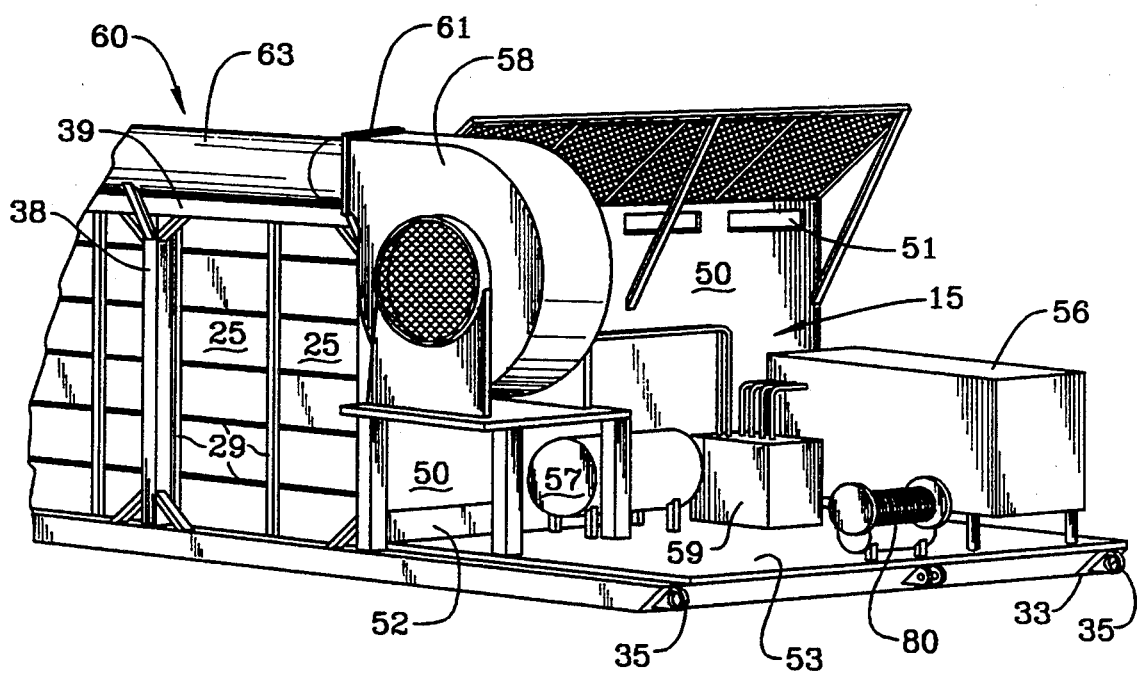
FIG. 3 is a partial perspective view of the portable incinerator of FIG. 1 showing its equipment deck.
Figure 5:
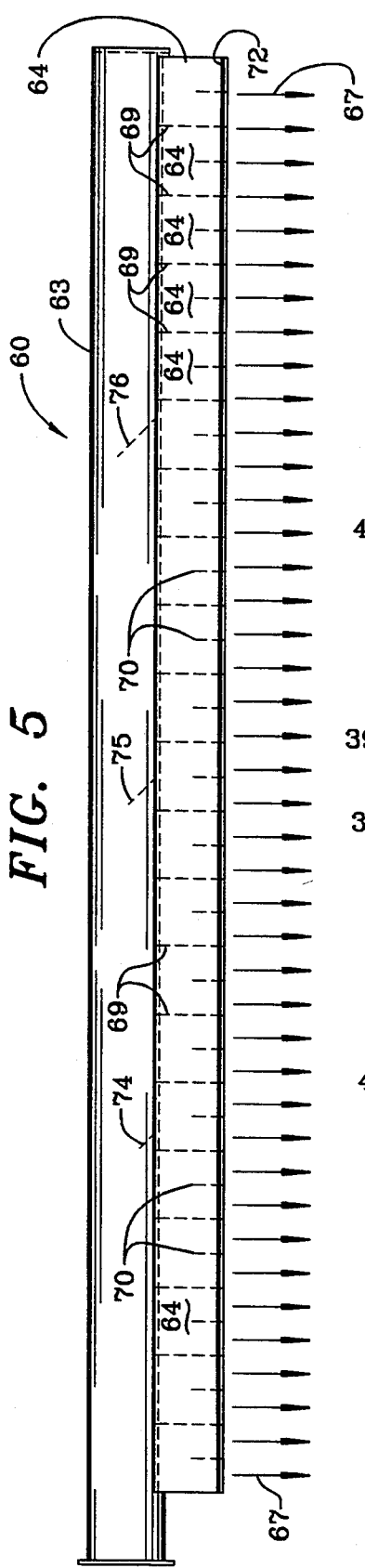
FIG. 5 is a top plan view of one embodiment of a manifold assembly used in the incinerator of FIG. 1.
Figure 4:
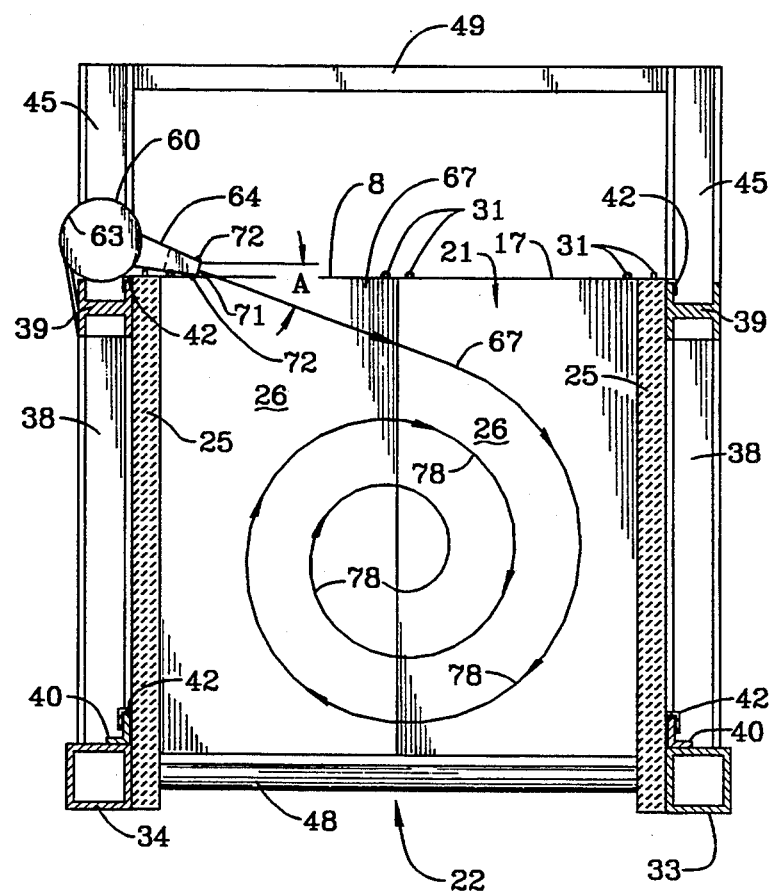
FIG. 4 is a sectional view taken transversely through the portable incinerator of FIG. 1 looking toward the back of its paneled doors.
Figures 6, 7, 8:
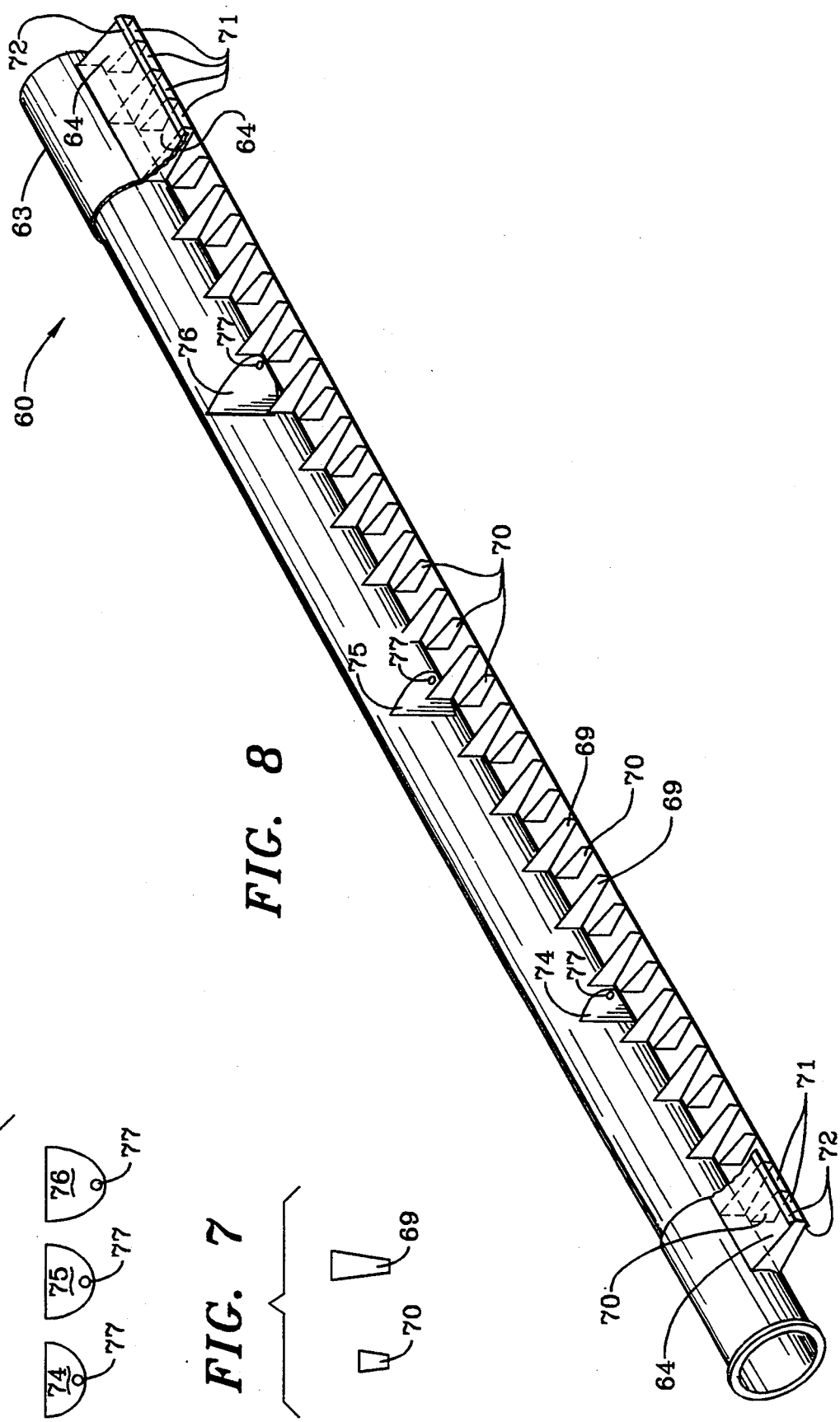
FIG. 6 is a plan view of the baffles in the manifold assembly of FIG. 5.
FIG. 7 is a plan view of the nozzle vanes in the manifold assembly of FIG. 5.
FIG. 8 is an isometric perspective view of the manifold assembly of FIG. 5 partially broken away to reveal its internal baffle and vane system.

Referring to FIG. 3, a heat shield 50, made of 10 gauge sheet steel, is installed on the front wall 15 to minimize any heat radiated from the combustion chamber 11 to an equipment deck 53 located in front of wall 15. Shield 50 is spaced 6" from the panels 25 of wall 15, with a 6" high gap 51 above and a 6" high gap 52 below shield 50 for allowing the passage of convected air therethrough. The upper gap 51 preferably has a 45° bevel to aid the flow of air. The front deck 53 is formed by a ¼" steel diamond plate mounted between skids 33 and 34, and measuring approximately 6'×10'9" in area. Deck 53 mounts various pieces of equipment including a diesel engine 56 and fuel tank 57 for powering a fan 58 through a hydraulic drive system 59. A more complete description of this equipment follows latter on. Fan 58 supplies high velocity air to a manifold assembly 60, which will be described in detail hereafter. Natural convected air flowing behind shield 50 through gaps 51 and 52 dispenses radiated heat from the refractory panels 25 in front wall 15, thus protecting the equipment on deck 53. The diesel engine 56 is mounted on a 6"×8.2# channel rack and is provided with a removable oil drain/spillage pan. The fuel tank 57, fan 58 and hydraulic drive 59 are each mounted on 6"×8.2# channel or 3"×4.1# channel, and 4"×⅜" square tubing legs are used to elevate the fan 58 up to the manifold assembly 60 which is mounted along the top of the beam 39 of side wall 13.

Referring to FIGS. 3-8, the high velocity air is discharged from fan 58 through a 10 gauge sheet steel square-to-round transfer nozzle 61 which, in turn, directs the air into the manifold assembly 60. The manifold assembly 60 includes a tubular housing 63 of approximately 14" in diameter, made from 10 gauge steel pipe, in air transfer communication with transfer nozzle 61 and a plurality of discharge nozzles 64 in position along the length of manifold housing 63 for directing an effective sheet or curtain of high velocity air (as shown by arrows 67) across the top opening 21 and down into the combustion chamber 11 at an angle A of preferably about 20°. The discharge nozzles 64 are fabricated out of 3/16" steel plate with each nozzle 64 including two spaced vanes 69 of equal length and a shorter vane 70 that forms two discharge ports 71. Any two adjacent vanes 69 and 70 are spaced on 6" centers, and vanes 69 (i.e., nozzles 64) tapper down from 4" to 1⅝" wide. Nozzles 64 are preferably of single unit construction as shown in the drawings. Field tests indicate that the shorter vanes 70 tend to cause hot air and particulate from the combustion chamber 11 to be sucked into nozzles 64 thereby reducing their service life and that using vanes 70 equal in length to vanes 69 may help prevent this sucking action. A length of 1"×¼" steel angle is used as a stiffener 72 on the end of nozzles 64 above and below ports 71. The stiffeners 72 help nozzles 64 to withstand extended exposure to the high temperatures generated in chamber 11.

With discharge ports 71 of approximately 12 square inches in area, exit velocities in excess of 100 miles per hour may be produced with a fan 58 operable at 2300 RPM's and 6" of static pressure, such as the size 22 DWDI Double Width Acoustafoil fan manufactured by The New York Blower Company. With such a fan 58 an air flow in excess of 18,000 cubic feet per minute can be produced. An engine 56 rated at 24 brake horse power should be sufficient to drive this fan 58 and obtain such a flow rate.

However, a direct injected, naturally aspirated diesel engine 56 rated at 76 horse power of 2400 RPM's under continuous duty is preferred (e.g., the 4 cylinder 3054 diesel engine made by Caterpillar). Satisfactory results have been obtained interconnecting the above Acoustafoil fan 58 and Caterpillar engine 56 by a hydraulic drive system 59, such as the 3.9 cubic inches/revolution displacement pump and 3.3 displacement motor manufactured by the Eaton corporation. A Bell Housing mounted on the engine 56 may used to provide a direct spline coupling to the Eaton pump. At 2000 RPM's on the diesel engine 56, this pump produces 34 gallons per minute at a maximum pressure of 6000 PSI which powers the Eaton motor providing a potential maximum of 189 horse power at a shaft RPM of 2400. The Eaton motor and the drive shaft of fan 58 are joined by a Lovejoy Coupling. The closed hydraulic system 59 is equipped with a high pressure filter and a low pressure filter to insure filtration levels below factory specifications.

Manifold assembly 60 also includes a system of internal scuffers or baffles 74, 75 and 76 of increasing size (5⅞", 6 5/16" and 6⅝" in height respectively when laid flat) that separate off amounts of the high velocity air traveling down tube 63 so as to maintain a substantially uniform discharge rate of the air as it exits each nozzle 64 along the top opening 21. Each baffle 74, 75 and 76 is tilted at an angle of about 45°. To reduce negative pressure behind each baffle 74, 75 and 76, a hole 77 approximately 1 inch in diameter is formed through each baffle near its base. This negative pressure tends to suck in hot air and particulate from chamber 11 and disrupt the uniform discharge rate. The high velocity air curtain 67 covers the top opening 21 and creates a rotational turbulence (as shown by arrow 78) within the combustion chamber 11. It has been found that because of the substantially uniform discharge rate, the resulting curtain 67 of high velocity air over the top opening 21 limits the amount of particulate, such as ash, released into the atmosphere during combustion virtually eliminating smoke. The resulting high velocity air curtain 67 is also more likely to trap unburned particulate as well. This trapped material is then subsequently burned, thereby enabling combustion nearing 100% of the vegetation waste. The rotational turbulence 78 provides an oxygen enriched environment within the chamber 11 and thereby accelerates the combustion of the waste material and results in a more complete burn (i.e., combustion) by raising the temperatures within the chamber 11.

With such a high degree of combustion, the bulk of the vegetation waste is reduced by up to 98% with only a small amount of residual ash remaining. Even so, after days of burning, the ash can build up on the bottom of the combustion chamber 11 (i.e., the ground) and reduce its efficiency. This built-up ash can be removed by opening the doors 17 and 18 (see FIG. 2), and dragging the incinerator 10 forward (See arrow 79) leaving the ash behind on the ground. The ash can then be sold to a nursery or mixed-in with the local soil as a desirable, non-polluting nutrient additive. To facilitate moving the incinerator 10 during this process, a bulldozer or similar vehicle (not shown) can be used to drag the incinerator 10 during this process, or preferably, a winch and cable assembly 80 mounted on the front deck 53 may be used. The cable could be attached to any sufficiently fixed object, such as a large tree and the incinerator 10 pulled toward the tree by the winch.

In order to optimize the combustion of the vegetation waste, the temperatures inside the combustion chamber 11 should approach 2500° F. to 2800° F. To reach the optimum combustion temperatures as quickly as possible, the incinerator 10 preferably includes a diesel and-/or propane ignition system (not shown) for initially igniting and fueling the combustion of the vegetation waste until these temperatures are achieved.

From the above disclosure of the general principles of the present invention and the preceding detailed description, those skilled in this art will readily comprehend the various modifications to which the present invention is susceptible. Therefore, the scope of the invention should be limited only by the following claims and equivalent thereof.

What is claimed is:

1. A portable incineration apparatus comprising:
   a transportable box defined by four walls with an open top and an open bottom, said walls lined with a refractory material operatively associated with said open bottom to form a combustion chamber, one said wall having two doors being openable outwardly;
   a source of high velocity air;
   a manifold assembly in air transfer communication with said source of high velocity air, said manifold assembly being adapted to direct an effective curtain of high velocity air across said top opening and down into said combustion chamber at an angle of about 20 degrees to maintain a substantially uniform discharge rate of the high velocity air as it passes through and exits said manifold assembly along said top opening.

2. The portable incineration apparatus of claim 1 including a system for initially igniting and fueling the combustion of vegetation waste in said combustion chamber.

3. The portable incineration apparatus of claim 1 including an upper brace and a lower brace respectively disposed above and below said doors and proximate to said end wall.

4. The portable incineration apparatus of claim 1, the curtain of high velocity air covering said top opening and creating a rotational turbulence within said combustion chamber.

5. A portable incineration apparatus for burning wood waste comprising:
   a transportable box having four walls, a top opening, and a bottom opening, said walls lined with a refractory material operatively associated with said open bottom to form a combustion chamber, one said wall having at least one door being openable outwardly including an upper brace and a lower brace respectively disposed above and below said door;
   a source of high velocity air;
   a manifold assembly in air transfer communication with said source of high velocity air, said manifold assembly having a plurality of nozzles to direct an effective curtain of high velocity air across said top opening and down in to said combustion chamber and a plurality of internal baffles to maintain a substantially uniform discharge rate of the high velocity air as it passes through and exits said manifold assembly along said top opening, the curtain of high velocity air covering said top opening and creating a rotational turbulence within said combustion chamber and;
   a system for initially igniting and fueling the combustion of waste in said combustion chamber.

6. The portable incineration apparatus of claim 5, each of said baffles having a hole formed therethrough for reducing back pressure detrimental to maintaining the substantially uniform discharge rate of the high velocity air.

7. The portable incineration apparatus of claim 5 including an equipment deck located in front of one wall and a heat shield installed on said one wall to minimize heat radiated from said combustion chamber to said equipment deck, said heat shield being spaced from the refractory material in said one wall with a gap above and a gap below said shield for allowing the passage of convected air therethrough.

8. The portable incineration apparatus of claim 5, said box having two opposite walls with a skid mounted to the bottom of each.

9. The portable incineration apparatus of claim 5, each of said plurality of discharge nozzles including two spaced vanes of approximately equal length and a shorter vane disposed therebetween forming two discharge ports.

10. The portable incineration apparatus of claim 5, each of said plurality of discharge nozzles including three spaced vanes of approximately equal length forming two discharge ports.

11. The portable incineration apparatus of claim 5, each of said plurality of discharge nozzles having an end and at least one discharge port, with a stiffener on the end of each nozzle above and below its port to help in withstanding extended exposure to high temperatures generated in said combustion chamber.

* * * * *